July 25, 1933.  R. P. CLARK  1,919,414
FRUIT PACKER
Filed Jan. 17, 1931  3 Sheets-Sheet 1
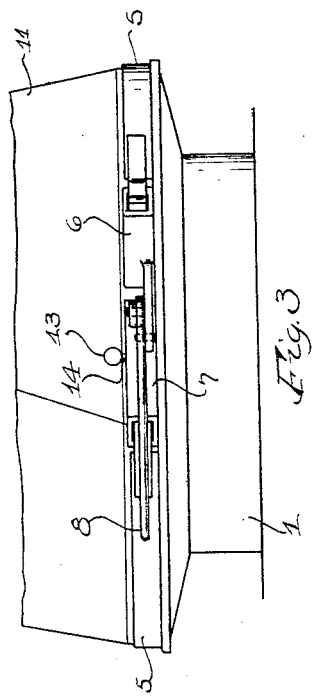
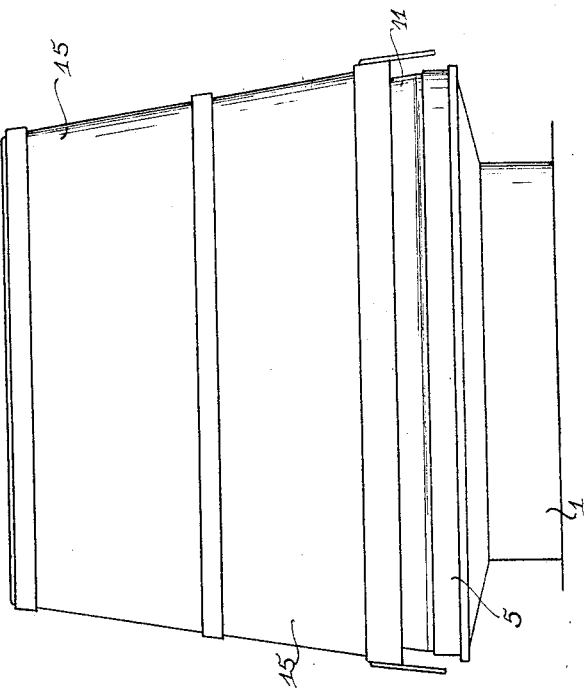
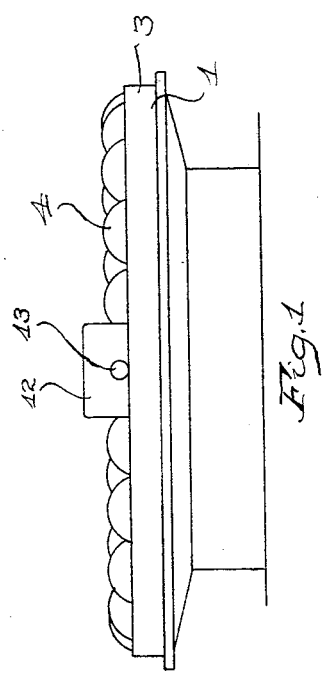
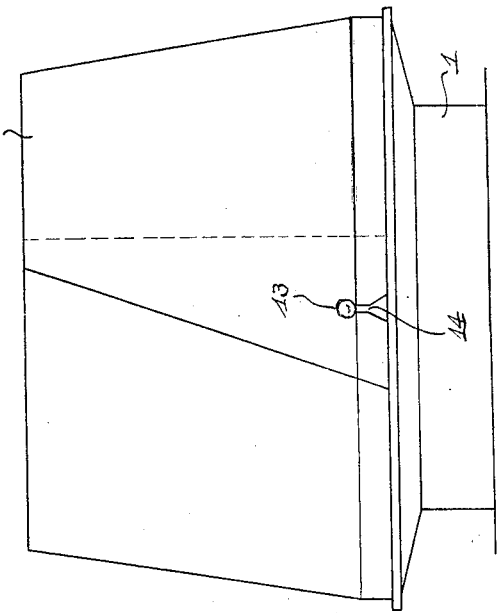
INVENTOR
Raymond P. Clark
BY H. W. Simms
his ATTORNEY

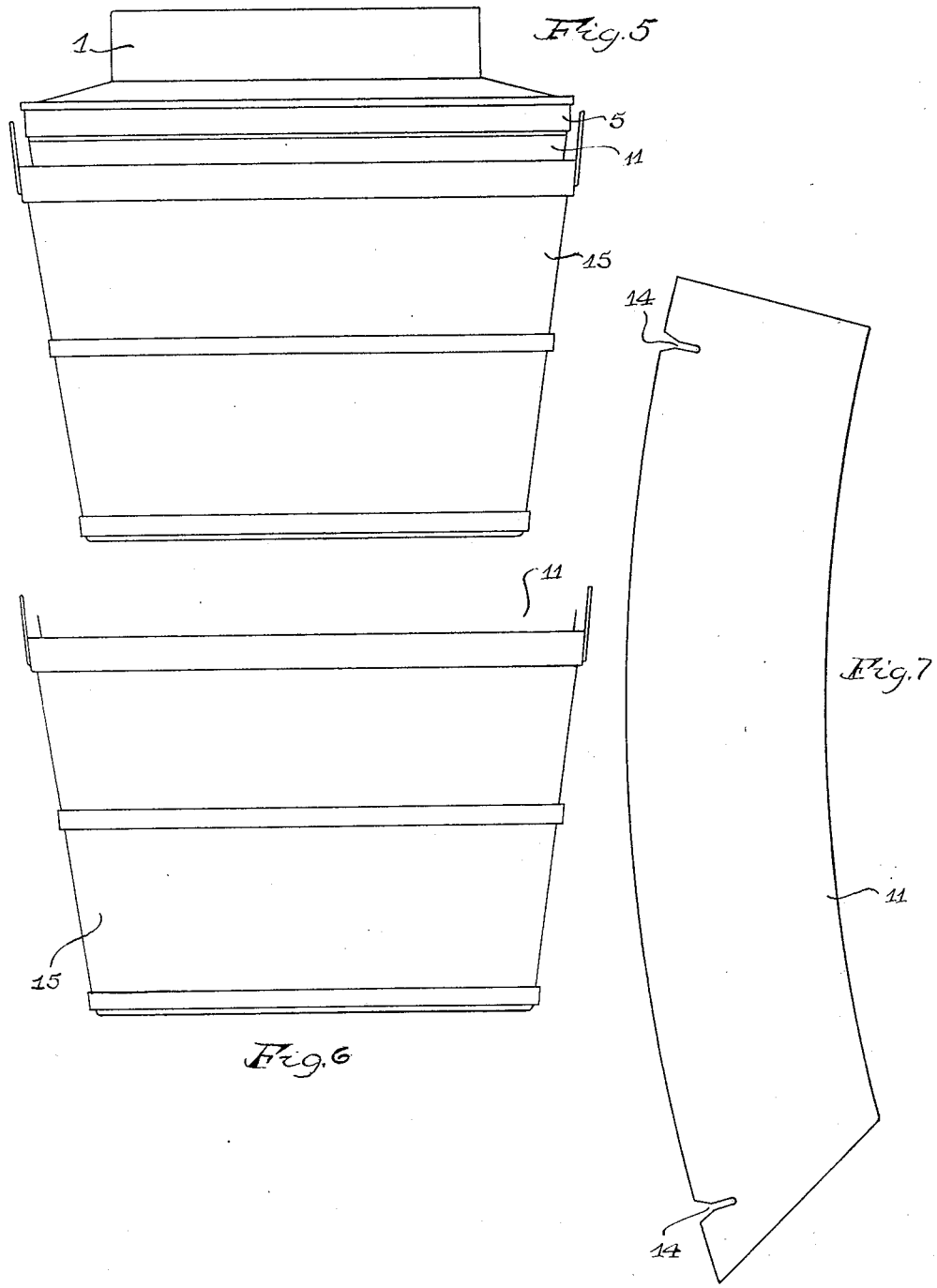

July 25, 1933.  R. P. CLARK  1,919,414
FRUIT PACKER
Filed Jan. 17, 1931  3 Sheets-Sheet 3
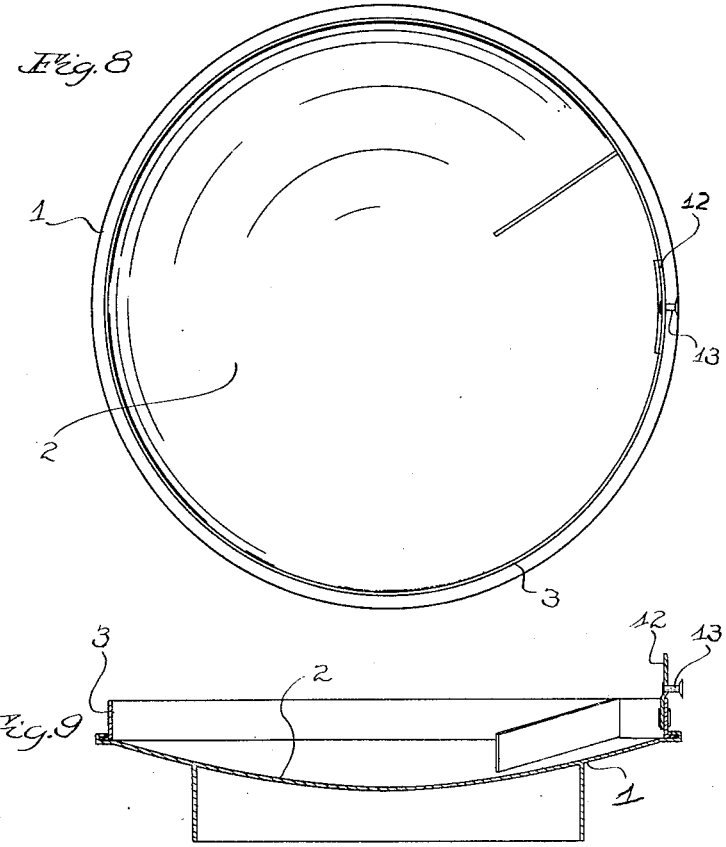
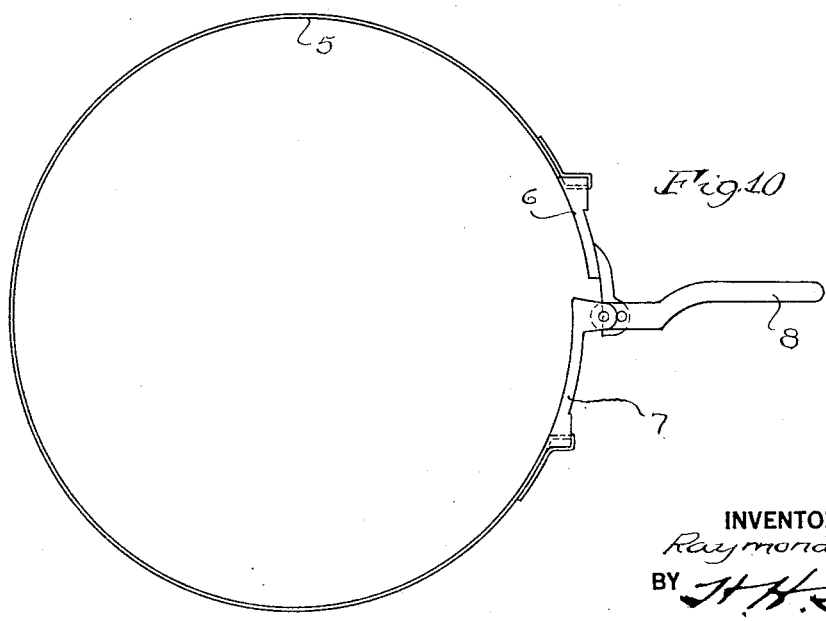
INVENTOR
Raymond P. Clark
BY
His ATTORNEY Patented July 25, 1933

1,919,414

UNITED STATES PATENT OFFICE

RAYMOND P. CLARK, OF ROCHESTER, NEW YORK, ASSIGNOR TO CLARK STEK-O CORPORATION, OF ROCHESTER, NEW YORK, A CORPORATION OF NEW YORK

FRUIT PACKER

Application filed January 17, 1931. Serial No. 509,440.

The present invention relates to a fruit packer. An object of this invention is to provide against contact between the fruit and the inner face of the side walls of a receptacle. Another object of the invention is to eliminate the bursting of liners in fruit baskets due to the liner not fitting the basket. A further object of the invention is to provide an initially split liner in which a facing and a column of fruit may be built up and which when uprighted into a basket will not burst and permit the fruit to come into contact with the inner face of the side wall of the receptacle. Still another object of the invention is to provide the facing member with means for holding an initially split liner so that a column of fruit may be arranged therein. A still further object of the invention is to provide a liner which may be shipped in a flat condition so as not to be weakened by creases and yet can be used to build up a faced column of fruit which will entirely fill the receptacle into which the fruit is to be packed.

To these and other ends, the invention consists of certain parts and combinations of parts all of which will be hereinafter described; the novel features being pointed out in the appended claims.

In the drawings:

Fig. 1 is a side view of a facing member which may be employed in the present invention;

Fig. 2 shows a liner which may be employed in the present invention arranged upon the facing member;

Fig. 3 is a view showing the clamping means in position to hold the liner to the facing member;

Fig. 4 shows a basket fitted in an inverted position over the liner;

Fig. 5 shows the parts illustrated in Fig. 4 uprighted;

Fig. 6 shows the facing member removed;

Fig. 7 is a plan view of a liner made in accordance with this invention;

Figs. 8 and 9 are plan and sectional views respectively of the facing member; and Fig. 10 is a plan view of the clamp.

Prior to this invention it has been common to build up a faced column of fruit, candy or other articles in an inverted position within an endless liner made of paperboard or the like and then fit over the column a receptacle which when uprighted with the column within the liner would cause the column to settle compactly within the receptacle. It has been found however that the endless liner when it does not fit the basket breaks either at the time of packing or later after storage and this breaking or bursting permits the articles to come in contact with the inner faces of the side walls of the receptacle at the splits or breaks and become bruised thereby, the very thing that the liner is designed to prevent.

According to this invention an endless liner is done away with and in place an initially split liner is employed with its ends overlapping. A column of fruit is built within the liner while the latter is so held to prevent separation at the split, and the receptacle is filled with the column of fruit by placing such receptacle over the fruit in an inverted position and then uprighting the liner, column of fruit and the receptacle. Upon the release of the liner prior to the complete uprighting of the receptacle, the column of fruit will settle in the receptacle at the time of packing but there is no gap in the liner which will expose the inner face of the side wall of the receptacle to contact by the fruit or article in the receptacle.

A novel means for carrying out this invention may comprise a facing member 1 having a concave top face 2 with an annular flange 3 projecting about said face. This face within the flange 3 serves to provide a support for the facing layer of fruit or other articles 4.

Associated with this facing member is a liner holding means comprising, in this instance, a split ring or band 5 formed of flexible material such as a thin brass strip loosely connected at its ends to two castings 6 and 7 connected by a toggle lever 8 pivoted at 9 and 10 respectively to the castings 6 and 7, the pivots being so arranged that the lever 8 is held in a locking position, but may be thrown to an open position to expand the ring. The band is passed about the flange 3 to hold a liner adjacent one edge on the flange.

The liner 11, in this instance, is made from card or paperboard stock, as for instance, a sixteen point news pulp stock or chip board sized or treated to make it water resistant and also to give it strength so that it will not readily split under the internal pressure of the fruit or other articles to be packed. The liner is in the form of a curved strip, so as to form when curved, an initially split member with overlapping ends.

With the end in view of sustaining the liner on the facing member before clamping the same by the clamping means, interlocking means may be provided on the facing member for releasably holding the ends of the liner overlapped while surrounding the flange. In this instance, a plate projection 12 is extended upwardly above the flange and carries a headed projection 13 extending outwardly and horizontally beyond the flange. The liner is provided in one edge near opposite ends thereof with two slots 14 having enlarged inner ends. When the liner is fitted on the facing member so that the headed projection is received in both of the slots, the liner will be sustained on the facing member while the clamping ring is being slipped over the liner and clamped about the lower edge of the liner.

The liner and clamping ring are fitted to the facing member, after the latter is faced with a layer of the articles to be packed, and then the column of fruit is built up in the liner. After this the receptacle 15 is slipped in an inverted position over the liner, and the receptacle 15 is uprighted while holding the facing plate to the basket by the hands or otherwise. The clamping ring may be expanded either before or immediately after the uprighting. This causes the liner and the fruit to settle in the basket. In settling in the basket the liner is disconnected from the facing member, and expands due to the split or loosely connected overlapping portions, so that the liner settles against the inner face of the receptacle without bursting, and makes a full solid pack without a sunken face. The overlapping portions are of such widths that the articles in the receptacle will not be exposed to the sides of the receptacle.

This invention makes it possible to employ a liner which will be free from weakening creases and will dispense with the expense of pasting. It, furthermore, does away with the bursting of liners, and thereby gives better protection to the contents of the receptacle. The liner can be shipped in a flat condition.

What I claim as my invention and desire to secure by Letters Patent is:

1. In a packer, the combination with a facing member, of an initially split liner having overlapping ends and arranged on the facing member, and means exteriorly of the liner for releasably holding said liner to the facing member.

2. In a packer, the combination with a facing member provided with an upstanding annular shoulder, of an initially split liner having overlapping ends fitted about the shoulder, and clamping means exteriorly of the liner for clamping said liner against the shoulder.

3. In a packer, the combination with a facing member provided with an upstanding annular shoulder, of a projection extending outwardly beyond said shoulder, an initially split liner fitting said shoulder, having overlapping ends and splits in its edge near said ends receiving said projection, and means exteriorly of the liner for clamping said liner to the shoulder.

4. In a packer, the combination with a facing member having an upstanding annular shoulder, of an initially split liner fitting about said shoulder, having overlapping end portions and provided in its edge adjacent the shoulder and adjacent its ends with slots, means on the facing member entering said slots to hold the liner ends in overlapped relation on the facing member, and means exteriorly of the liner for clamping the said liner to the facing member.

5. In a packer, the combination with a facing member, of an initially split liner having overlapping ends, interlocking means carried by the facing member and the liner adjacent opposite ends to hold the ends of the liner overlapped, and means exteriorly of the liner for clamping the said liner to the facing member.

RAYMOND P. CLARK.